US010661348B2

(12) United States Patent
Chen et al.

(10) Patent No.: US 10,661,348 B2
(45) Date of Patent: May 26, 2020

(54) SILVER NANOWIRE SYNTHESIS WITH (METH)ACRYLATE BASED CAPPING AGENTS

(71) Applicant: BASF SE, Ludwigshafen (DE)

(72) Inventors: Li Chen, Shanghai (CN); Friederike Fleischhaker, Ludwigshafen (DE); Andrea Misske, Speyer (DE); Sylke Haremza, Neckargemuend (DE)

(73) Assignee: BASF SE, Ludwigshafen (DE)

( * ) Notice: Subject to any disclaimer, the term of this patent is extended or adjusted under 35 U.S.C. 154(b) by 205 days.

(21) Appl. No.: 15/554,771

(22) PCT Filed: Mar. 3, 2016

(86) PCT No.: PCT/EP2016/054513

§ 371 (c)(1),
(2) Date: Aug. 31, 2017

(87) PCT Pub. No.: WO2016/139290

PCT Pub. Date: Sep. 9, 2016

(65) Prior Publication Data

US 2018/0043436 A1 Feb. 15, 2018

(30) Foreign Application Priority Data

Mar. 3, 2015 (EP) .................................... 15157470

(51) Int. Cl.

*C08L 35/02* (2006.01)
*B22F 9/24* (2006.01)
*B22F 1/00* (2006.01)

(52) U.S. Cl.

CPC .............. *B22F 9/24* (2013.01); *B22F 1/0025* (2013.01); *B22F 2301/255* (2013.01); *C08L 35/02* (2013.01)

(58) Field of Classification Search

CPC . C08K 2003/2286; C08L 35/02; C08L 39/04; C08F 8/42; C08F 20/10;

(Continued)

(56) References Cited

U.S. PATENT DOCUMENTS

| | | | | |
|---|---|---|---|---|
| 7,922,787 B2 | 4/2011 | Wang et al. | | |
| 2009/0196788 A1* | 8/2009 | Wang | B22F 9/24 420/501 | |

(Continued)

FOREIGN PATENT DOCUMENTS

| | | |
|---|---|---|
| CN | 103167920 A | 6/2013 |
| CN | 103357890 A | 10/2013 |

(Continued)

OTHER PUBLICATIONS

International Search Report dated May 9, 2016 in PCT/EP2016/054513 filed Mar. 3, 2016.

(Continued)

*Primary Examiner* — Robert C Boyle

(74) *Attorney, Agent, or Firm* — Oblon, McClelland, Maier & Neustadt, L.L.P.

(57) ABSTRACT

The present invention relates to the use of a compound as a capping agent for controlling or modifying the growth of silver nanowires in a polyol method. The invention also relates to a corresponding method of making silver nanowires. And even further, the present invention relates to a product comprising silver nanowires having adsorbed to their surface a capping agent compound.

18 Claims, 6 Drawing Sheets

1a)

20 μm

Figure 1A:
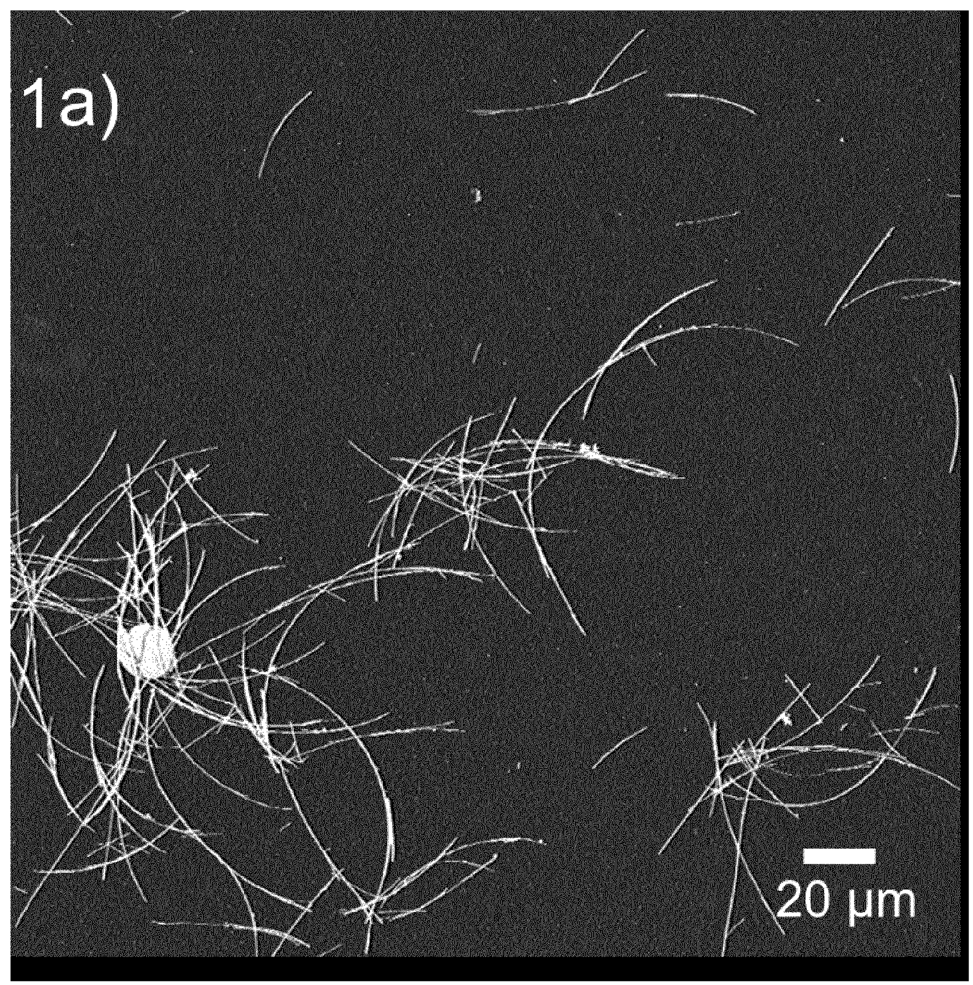

(58) Field of Classification Search
CPC .......... C08F 20/28; C08F 20/34; C08F 20/36; C08F 20/62; C08F 20/68; C08F 26/06; C22F 1/14
See application file for complete search history.

(56) References Cited

U.S. PATENT DOCUMENTS

| | | | | |
|---|---|---|---|---|
| 2009/0282948 | A1 | 11/2009 | Xia et al. | |
| 2011/0185852 | A1 | 8/2011 | Allemand | |
| 2012/0247275 | A1 | 10/2012 | Yang et al. | |
| 2013/0255444 | A1* | 10/2013 | Kawaguchi | B22F 9/24<br>75/371 |
| 2014/0123808 | A1 | 5/2014 | Lynch et al. | |
| 2014/0178246 | A1 | 6/2014 | Alsayed et al. | |
| 2014/0178247 | A1 | 6/2014 | Alsayed et al. | |
| 2015/0336173 | A1* | 11/2015 | Kim | C30B 7/14<br>75/370 |

FOREIGN PATENT DOCUMENTS

| | | | |
|---|---|---|---|
| CN | 103433503 | A | 12/2013 |
| JP | 2012-140701 | | 7/2012 |
| TW | 201236781 | A1 | 9/2012 |
| WO | WO 2012/081160 | A1 | 6/2012 |
| WO | 2013/004767 | A1 | 1/2013 |
| WO | 2013/191337 | A1 | 12/2013 |
| WO | 2014/052887 | A2 | 4/2014 |
| WO | WO2014/052887 | A2 | 4/2014 |
| WO | 2014/169487 | A1 | 10/2014 |
| WO | WO2014/169487 | A1 | 10/2014 |

OTHER PUBLICATIONS

Extended European Search Report dated Aug. 28, 2015 in European Application 15157470.4 filed Mar. 3, 2015.

Combined Taiwanese Office Action and Search Report dated Sep. 20, 2019 in corresponding Taiwanese Patent Application No. 105106281 (with English Translation), 7 pages.

Combined Chinese Office Action and Search Report dated May 29, 2019 in Patent Application No. 201680012688.2 (with English translation of Categories of Cited Documents), 7 pages.

Office Action dated Mar. 3, 2020 in Japanese Patent Application No. 2017-546622 filed Mar. 3, 2016 (w/ English-language translation).

* cited by examiner

SILVER NANOWIRE SYNTHESIS WITH (METH)ACRYLATE BASED CAPPING AGENTS

The present invention relates to the use of a specific compound (as defined in more detail below) as a capping agent for controlling or modifying the growth of silver nanowires in a polyol method. The invention also relates to a corresponding method of making silver nanowires. And even further, the present invention relates to a product comprising silver nanowires having adsorbed to their surface a capping agent compound (as defined below in more detail). The invention is defined in the attached claims, and specific aspects are additionally defined below.

Silver nanowires are used for numerous purposes in industry. E.g., transparent conductive films are widely used in display devices, input touch panels and solar cells. Until today, ITO, an indium tin oxide, represents the main type of material being used to prepare such films, because of its good electrical conductivity and optical transparency. The most common process to prepare ITO thin films is depositing ITO by physical vapour deposition (PVD). However, this process requires costly, complicated deposition equipment not suitable for large area substrates or roll-to-roll processes. Besides, limited supply of indium and brittle ITO substrates also brings drawbacks to the use of ITO in transparent conductive films.

Thus, in order to overcome the above-mentioned problems with ITO, silver nanowires, i.e. silver nanowires having a small diameter of e.g. 100 nm or less and having a length of e.g. 20 μm or more, have been utilized to prepare thin films with excellent electrical conductivity, optical transparency as well as low weight and flexibility. As stated before, there are numerous further uses of silver nanowires in industry.

The general process for synthesizing silver nanowires is the so-called polyol method as described for instance in the following documents: Xia et al., Nano Lett. 2002, 2, 165; Adv. Mater. 2002, 14, 833; Chem. Mater. 2002, 14, 4736. A key reagent in the polyol method is a compound which is typically designated as "capping agent" which can control or modify the growth of said silver nanowires. Polyvinylpyrrolidone (PVP) is presently the most widely used capping agent. Corresponding patent documents are amongst others US 2009/0282948 A1, US 2011/0185852 A1, US 2014/0123808 A1, WO 2013/191337 A1, CN 103433503 A.

Other compounds which have been used successfully as capping agents include cetyltrimethylammoniumbromide (CTAB), see CN 103357890 A, and polymers polymerized from N-substituted (meth)acrylamide, see US 2013/0255444.

Sun et al. (Nano Lett., Vol. 2, No. 2, 2002, 165-168) disclose the synthesis of "Crystalline Silver Nanowires by Soft Solution Processing" (title). In the first step of the synthesis as described in this document Pt nanoparticles were formed by reducing $PtCl_2$ with ethylene glycol refluxed at ~160° C. The process is called "polyol process", and ethylene glycol serves as both solvent and reducing agent.

In the context of the present invention, the terms "polyol process", "polyol synthesis", and "polyol synthesis method" are considered as synonyms to "polyol method".

Sun et al. (Chem. Mater. 2002, 14, 4736-4745) disclose a "Uniform Silver Nanowires Synthesis by Reducing $AgNO_3$ with Ethylene Glycol in the Presence of Seeds and Poly (Vinyl Pyrrolidone)" (title). According to the abstract, the first step of this process involves a formation of Pt (or Ag) nanoparticles by reducing $PtCl_2$ (or $AgNO_3$) with ethylene glycol (EG) heated to ~160° C. These Pt (or Ag) nanoparticles could serve as seeds for the heterogeneous nucleation and growth of silver. In the presence of poly(vinyl pyrrolidone), the growth of silver could be directed into a highly anisotropic mode to form uniform nanowires with aspect ratios as high as ~1000.

Sun and Xia (Adv. Mater. 2002, 14, No. 11, 833-837) disclose a "Large-Scale Synthesis of Uniform Silver Nanowires Through a Soft, Self-Seeding, Polyol Process" (title). Disclosed in this document is a solution-phase method that generates silver nanowires by reducing silver nitrate with ethylene glycol in the presence of poly(vinyl pyrrolidone). In this polyol process the ethylene glycol acts as both solvent and reducing agent. PVP is used as a coordination reagent in order to control the morphological evolution of metal nanostructures in the solution phase. The document appears to imply that no other coordination reagent allows to achieve at silver nanowires having a similar uniformity and yield.

In the context of the present invention, the term "coordination reagent" or "capping agent" is considered as a synonym to "capping agent compound".

Korte et al. (J. Mater. Chem., 2008, 18, 437-441) disclose a "Rapid synthesis of silver nanowires through a CuCl- or $CuCl_2$-mediated polyol process" (title). According to the abstract, a simple and rapid (reaction time ~1 h) route to Ag nanowires, in which ethylene glycol serves as the solvent and a precursor to the reducing agent, is disclosed. Poly (vinyl pyrrolidone) is used as a stabilizer, copper (I) or copper (II) chloride were added to the reaction to reduce the amount of free $Ag^+$ during the formation of initial seeds and in order to scavenge adsorbed oxygen from the surface of the seeds once formed.

In the context of the present invention, the term "stabilizer" as used by Korte et al. is considered as a synonym to "capping agent compound".

Huang et al. (Langmuir, Vol. 12, No. 4, 1996, 909-912) disclose the "Photochemical Formation of Silver Nanoparticles in Poly(N-vinylpyrrolidone)" (title).

US 2012/0247275 A1 discloses a process for forming monodispersed silver nanowires, wherein a polyol is utilized. A capping agent is mixed in the polyol to form a substantially homogeneous solution. Polyvinylpyrrolidone (PVP) is disclosed as a capping agent.

U.S. Pat. No. 7,922,787 B2 discloses "Methods for the production of silver nanowires" (title) in particular, novel methods for the solution-based production of silver nanowires by adaption of the polyol process are disclosed in this document. PVP is disclosed as an "organic protective agent".

In the context of the present invention, the term "organic protective agent" as used in U.S. Pat. No. 7,922,787 B2 is considered as a synonym to "capping agent compound".

US 2009/0282948 A1 discloses "Methods of nanostructure formation and shape selection" (title). According to the abstract, in particular nanowires of silver may be formed by combining a solution of silver nitrate in ethylene glycol with a solution of poly(vinyl pyrrolidone) in ethylene glycol. PVP is designated a "shape-selective reagent".

In the context of the present invention, the term "shape-selective reagent" as used in US 2009/0282948 A1 is considered as a synonym to "capping agent compound".

US 2011/0185852 A1 discloses "Methods of controlling nanostructure formations and shapes". According to the abstract, a method of forming monodispersed metal nanowires comprises: forming a reaction mixture including a metal salt, a capping agent and a quaternary ammonium chloride in a reducing solvent at a first temperature; and forming metal nanowires by reducing the metal salt in the reaction mixture. According to US 2011/0185852 A1 "capping agent" refers to a chemical agent that preferentially interacts and adheres to a lateral surface of a growth nanowire, such that the capping agent confines the lateral surface from growing and encourages a cross section surface of the nanowire to crystallize.

US 2013/0255444 A1 discloses a "Process for producing silver nanowires and agent for controlling growth of silver nanowires" (title). The agent for controlling the growth of silver nanowires comprises a polymer obtained by polymerizing one or more polymerizable monomers comprising a N-substituted (meth)acrylamide. The agent for controlling growth of silver nanowires is reacted with a silver compound in a polyol at 25-180° C.

In the context of the present invention, the term "agent for controlling the growth of silver nanowires" as used in US 2013/0255444 A1 is considered as a synonym to "capping agent compound".

US 2014/0123808 A1 discloses "nanowire preparation methods, compositions, and articles" (title). Regarding the general preparation of silver nanowires from silver ions, this document refers to numerous documents, including patent literature and non-patent literature.

WO 2013/191337 A1 discloses a "production method for silver nanowire" (title). In particular, a method is disclosed for producing silver nanowire having a high aspect ratio by optimizing the control conditions in a polyol synthesis method.

Although the specific polyol methods known in the art and as described in some detail in the documents referred to above already allow for the production of silver nanowires, there is still a demand in industry for alternative processes and, in particular, for further specific polyol methods which allow to produce silver nanowires very quickly, i.e. within 1 hour or less. In specific prior art polyol methods, typically the reaction time utilized for growing silver nanowires of a sufficient length is considerably higher than 1 hour. If in rare cases a reaction time of below 1 hour is used, the silver nanowires produced do typically not possess a uniform shape and size.

Furthermore, any process for the production of silver nanowires (in particular a polyol method) should allow for the synthesis of a multitude of silver nanowires of uniform shape and size, and the chemicals used should be readily available at low costs.

Correspondingly, it was a primary object of the present invention to provide for a compound that can be used as a capping agent for controlling or modifying the growth of silver nanowires in a polyol method. The use of the capping agent compound should preferably allow for the synthesis of a multitude of silver nanowires of uniform shape and size of preferably more than 10 μm. Furthermore, the capping agent compound should preferably allow for the rapid synthesis of a multitude of silver nanowires, i.e. the synthesis at elevated temperatures of preferably more than 160° C.

Correspondingly, it was a further object of the present invention to provide for a corresponding method of making silver nanowires, and to provide a corresponding product comprising silver nanowires.

The primary technical problem underlying the present invention is solved by the use of a compound as a capping agent for controlling or modifying the growth of silver nanowires in a polyol method, the compound being a polymer obtainable by polymerizing polymerizable monomers comprising monomers of formula (1)

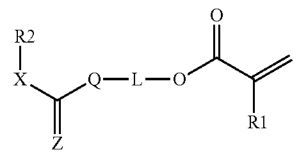

(1)

wherein

R1 is H or $CH_3$

L is a linking group having a total number of 1 to 25 carbon atoms and a total number of 0 to 10 oxygen atoms Q is O or S or N—R3

Z is O or S or NH

X is O or S or $CH_2$ or NH, and

R2 and R3 are independently of each other hydrogen, a substituted alkyl having a total number of 1 to 25 carbon atoms and a total number of 0 to 5 heteroatoms or unsubstituted alkyl having a total number of 1 to 25 carbon, or together represent an alkanediyl having n carbon atoms wherein n is an integer from 2 to 9, wherein said alkanediyl together with (i) the atom X and (ii) the nitrogen atom of N—R3 forms a heterocyclic ring having n+3 ring atoms.

In the context of the present invention the term "growth of silver nanowires in a polyol method" refers to the growth of silver nanowires in a liquid medium comprising ethylene glycol or another polyol compound as a reducing agent.

Typically, a polyol method of making silver nanowires comprises a step of preparing a mixture comprising a capping agent compound (as defined below), a polyol component and a silver compound (and, optionally, an oxygen scavenger compound selected from the group consisting of copper compound, iron compound and mixtures thereof). And typically, a polyol method of making silver nanowires comprises as a further step allowing said silver compound to react in said mixture with said polyol component so that silver nanowires result.

In the context of the present invention "capping agent for controlling or modifying the growth of silver nanowires in a polyol method" refers to a chemical agent which in a polyol method directs the growth of a silver nanoparticle so that a silver nanowire results.

Polymers which are obtainable by polymerizing polymerizable monomers comprising monomers of formula (1) as depicted above can be produced using a synthesis approach as known from the prior art.

E.g., methods for producing (meth)acrylic acid esters are disclosed in WO 2013/004767 A1. The disclosed methods can be used or adapted in order to prepare the polymerizable monomers of formula (1) as defined above. The corresponding polymer is then typically obtained by polymerizing the polymerizable monomers comprising monomers of formula (1) using radical polymerization. However, other types of polymerization are possible.

Surprisingly, polymers obtainable by polymerizing polymerizable monomers comprising monomers of formula (1) as defined above are suitable as capping agent compounds in a polyol method for making silver nanowires. And even more surprisingly, the use of such polymers allows for the production of silver nanowires in a simple setup and very quickly. Furthermore, the polymers used according to the present invention allow the production of silver nanowires having a length and/or an aspect ratio as typically needed in industry (i.e., an aspect ratio (length-to-width ratio) of 1000 or more, and even 2000 or more), typically with reaction times of 1 hour and less, which is in contrast to typical prior art processes.

The polymer obtainable by polymerizing polymerizable monomers comprising monomers of formula (1) can be a homopolymer, a copolymer or a polymer blend.

If the polymer is a copolymer it can be a copolymer which is obtainable by (a) polymerizing different polymerizable monomers of formula (1) or by (b) polymerizing one or more monomers of formula (1) with one or more monomers not being monomers of formula (1). If the polymer is a copolymer it can be based on one, two or more monomers of formula (1) and can simultaneously be based on one or more monomers which are not monomers of formula (1).

For the purposes of the present invention the polymer is preferably a homopolymer or a copolymer which is exclusively based on polymerizable monomers that are monomers of formula (1) each. This aspect of the present invention is discussed in more detail below.

When designing a polyol method of making silver nanowires rapidly and very uniformly, specific polymers obtainable by polymerizing polymerizable monomers comprising monomers of formula (1) are preferably used. Correspondingly, preferred is the use of a compound as defined above, wherein (with reference to formula (1)) linking group L is an alkanediyl group having a total number of 1 to 25 carbon atoms, or $—CH_2—CH_2—(O—CH_2—CH_2)_n—$, with n being an integer from 1 to 10.

More preferred is the use of a compound as defined above, wherein the linking group L is an alkanediyl group selected from the group consisting of $—CH_2—$
$—CH_2—CH_2—$
$—C(CH_3)H—CH_2—$
$—CH_2—C(CH_3)H—$
$—C(CH_3)H—C(CH_3)H—$
$—CH_2—CH_2—CH_2—$ and $—CH_2—CH_2—CH_2—CH_2—$ or is $—CH_2—CH_2—(O—CH_2—CH_2)_n—$, with n being an integer in the range of from 1 to 6, preferably 1 to 3.

Herein:

If n=1, the corresponding linking group L is
$—CH_2—CH_2—O—CH_2—CH_2—$

If n=2, the corresponding linking group L is
$—CH_2—CH_2—O—CH_2—CH_2—O—CH_2—CH_2—$ If n=3, the corresponding linking group L is
$—CH_2—CH_2—O—CH_2—CH_2—O—CH_2—CH_2—O—CH_2—CH_2—$.

Preferred is the use of a compound as defined above, wherein Q is N—R3. More preferably, Q is N—R3 and the linking group L is a preferred linking group as defined above.

Preferred is a use according to the present invention of a compound as defined above, wherein Q is N—R3 and wherein R2 and R3 together represent an alkanediyl having n carbon atoms wherein n is an integer from 2 to 9, wherein said alkanediyl together with (i) the atom X and (ii) the nitrogen atom of N—R3 forms a heterocyclic ring having n+3 ring atoms.

Preferably, R2 and R3 together represent an alkanediyl having n carbon atoms wherein n is 2 or 3. If n is 2, R2 and R3 together represent ethanediyl, wherein said ethanediyl together with the atom X and the nitrogen atom of N—R3 forms a heterocyclic ring having 5 ring atoms.

In the context of the present invention the use of a compound is preferred wherein L, Q, R2 and R3 each have a meaning that is hereinabove or hereinbelow defined as being preferred.

In particular, the use of a compound as defined above is preferred, wherein the linking group L is an alkanediyl group selected from the group consisting of $—CH_2—$
$—CH_2—CH_2—$
$—C(CH_3)H—CH_2—$
$—CH_2—C(CH_3)H—$
$—C(CH_3)H—C(CH_3)H—$
$—CH_2—CH_2—CH_2—$ and $—CH_2—CH_2—CH_2—CH_2—$ or is $—CH_2—CH_2—(O—CH_2—CH_2)_n—$, with n being an integer from 1 to 3, Q is N—R3, and R2 and R3 together represent an alkanediyl having n carbon atoms wherein n is an integer from 2 to 9, wherein said alkanediyl together with (i) the atom X and (ii) the nitrogen atom of N—R3 forms a heterocyclic ring having n+3 ring atoms.

The use of a compound as defined above is particularly preferred, wherein Z is O.

Preferred is also the use of a compound as defined above, wherein X is O or $CH_2$ or NH.

Particularly preferred is the use of a compound as defined above, wherein

R1 is H or $CH_3$ linking group L is an alkanediyl group selected from the group consisting of $—CH_2—$
$—CH_2—CH_2—$
$—C(CH_3)H—CH_2—$
$—CH_2—C(CH_3)H—$
$—C(CH_3)H—C(CH_3)H—$
$—CH_2—CH_2—CH_2—$ and $—CH_2—CH_2—CH_2—CH_2—$ or is $—CH_2—CH_2—(O—CH_2—CH_2)_n—$, with n being an integer from 1 to 3, Q is N—R3, R2 and R3 together represent an alkanediyl having n carbon atoms wherein n is an integer from 2 to 9, wherein said alkanediyl together with (i) the atom X and (ii) the nitrogen atom of N—R3 forms a heterocyclic ring having n+3 ring atoms, —Z is O, and X is O or $CH_2$ or NH.

Particularly preferred is the use of a compound as defined above, wherein

R1 is H or $CH_3$ linking group L is an alkanediyl group selected from the group consisting of

—$CH_2$—

—$CH_2$—$CH_2$—

—$C(CH_3)H$—$CH_2$—

—$CH_2$—$C(CH_3)H$—

—$C(CH_3)H$—$C(CH_3)H$—

—$CH_2$—$CH_2$—$CH_2$— and

—$CH_2$—$CH_2$—$CH_2$—$CH_2$— or is

—$CH_2$—$CH_2$—(O—$CH_2$—$CH_2$)$_n$—, with n being an integer from 1 to 3,

Q is N—R3,

R2 and R3 together represent ethanediyl, wherein said ethanediyl together with (i) the atom X and (ii) the nitrogen atom of N—R3 forms a heterocyclic ring having 5 ring atoms, Z is O, and X is O or $CH_2$ or NH.

Specifically preferred is the use of a compound as defined above, wherein

R1 is H or $CH_3$ linking group L is

—$CH_2$—$CH_2$— or

—$CH_2$—$CH_2$—(O—$CH_2$—$CH_2$)$_n$—, with n being an integer from 1 to 3,

Q is N—R3,

R2 and R3 together represent ethanediyl, wherein said ethanediyl together with (i) the atom X and (ii) the nitrogen atom of N—R3 forms a heterocyclic ring having 5 ring atoms, Z is O, and X is O or $CH_2$ or NH.

In many cases the use of a compound as defined above is most preferred, wherein the compound is a polymer obtainable by polymerizing polymerizable monomers comprising one or more monomers of formula (1) selected from the group consisting of:

(1-a)

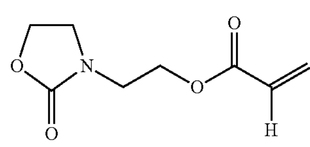

(1-b)

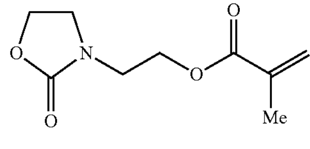

(1-c)

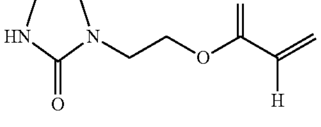

-continued (1-d)

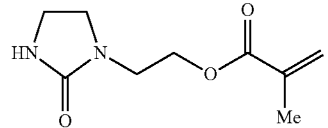

(1-e)

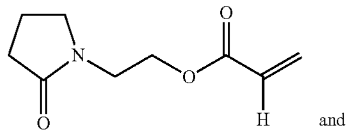

and (1-f)

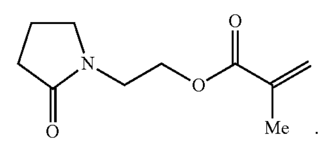

.

By way of example, the monomer of formula (1-a) is a monomer of formula (1), wherein R1 is H L is a linking group having 2 carbon atoms and a total number of 0 oxygen atoms Q is N—R3

Z is O

X is O, and

R2 and R3 together represent ethanediyl, wherein said ethanediyl together with (i) the atom X (being 0 in this case) and (ii) the nitrogen atom of N—R3 forms a heterocyclic ring having 5 ring atoms.

By way of example, the monomer of formula (1-b) is a monomer of formula (1), wherein R1 is Me L is a linking group having 2 carbon atoms and a total number of 0 oxygen atoms Q is N—R3

Z is O

X is O, and

R2 and R3 together represent ethanediyl, wherein said ethanediyl together with (i) the atom X (being 0 in this case) and (ii) the nitrogen atom of N—R3 forms a heterocyclic ring having 5 ring atoms.

By way of example, the monomer of formula (1-c) is a monomer of formula (1), wherein R1 is H L is a linking group having 2 carbon atoms and a total number of 0 oxygen atoms Q is N—R3

Z is O

X is NH, and

R2 and R3 together represent ethanediyl, wherein said ethanediyl together with (i) the atom X (being NH in this case) and (ii) the nitrogen atom of N—R3 forms a heterocyclic ring having 5 ring atoms.

By way of example, the monomer of formula (l-d) is a monomer of formula (1), wherein R1 is Me L is a linking group having 2 carbon atoms and a total number of 0 oxygen atoms Q is N—R3

Z is O

X is NH, and

R2 and R3 together represent ethanediyl, wherein said ethanediyl together with (i) the atom X (being NH in this case) and (ii) the nitrogen atom of N—R3 forms a heterocyclic ring having 5 ring atoms.

By way of example, the monomer of formula (l-e) is a monomer of formula (1), wherein R1 is H L is a linking group having 2 carbon atoms and a total number of 0 oxygen atoms Q is N—R3

Z is O

X is $CH_2$, and

R2 and R3 together represent ethanediyl, wherein said ethanediyl together with (i) the atom X (being $CH_2$ in this case) and (ii) the nitrogen atom of N—R3 forms a heterocyclic ring having 5 ring atoms.

By way of example, the monomer of formula (1-f) is a monomer of formula (1), wherein R1 is Me L is a linking group having 2 carbon atoms and a total number of 0 oxygen atoms Q is N—R3

Z is O

X is $CH_2$, and

R2 and R3 together represent ethanediyl, wherein said ethanediyl together with (i) the atom X (being $CH_2$ in this case) and (ii) the nitrogen atom of N—R3 forms a heterocyclic ring having 5 ring atoms.

As similarly stated above, the (most) preferred monomers as defined above can be combined with other (most) preferred monomers in order to prepare a copolymer that can be used as a capping agent compound, or one or more (most) preferred monomers of formula (1) can be combined with other monomers which are not monomers of formula (1) to prepare a copolymer that can be used as a capping agent compound.

It is particularly preferred to use a polymer which is a homopolymer obtainable by polymerizing one of the polymerizable monomers defined herein as being (most) preferred.

In some cases it is preferred to use a polymer obtainable by copolymerizing more than one polymerizable monomers comprising more than one monomers of formula (1) defined herein above as being (most) preferred.

Preferred is the use of a compound as defined above, wherein the capping agent compound has a weight average molecular weight ($M_W$) in the range of from 8000 to 4 000 000, preferably 20 000 to 2 000 000, more preferably 50 000 to 1 000 000.

As known in the art, weight average molecular weight ($M_W$) assessment is typically based on the result of a size exclusion chromatography (SEC) analysis.

If the weight average molecular weight ($M_W$) is low (and in particular, if the weight average molecular weight is below 8000) the use of a corresponding compound in a polyol method only has limited effects. In particular, the growth of silver nanowires is not as well controlled as with preferred capping agent compounds having a weight average molecular weight in the ranges as defined. In own experiments the best results have been achieved with a weight average molecular weight in the range of from 50 000 to 1 000 000.

Surprisingly, it has been found that the use of a compound as defined above as a capping agent for controlling or modifying the growth of silver nanowires in a polyol method allows for a very high reaction rate and simultaneously allows to obtain silver nanowires having a high aspect ratio (length-to-width ratio) of 1000 or more, and even 2000 or more. Furthermore, the growth of silver nanowires in the corresponding polyol method can be conducted at high temperatures which has the desired effect on reaction rate (reaction rate is increased with increasing temperature) without deteriorating the quality of the silver nanowires produced. The polymers obtainable by polymerizing polymerizable monomers comprising monomers of formula (1) comprise a C═O group and an additional C═Z group (wherein Z is O or S or NH). Without wishing to be bound by any theory, it is presently believed that this additional C═Z group assists in adsorbing the polymers used according to the present invention firmly to the respective surface of the growing silver nanowire, so that the temperature needed for desorption of said polymers from said surface is particularly high, in comparison with prior art capping agent compounds like PVP (see e.g. US 2013/0255444 A1, [0045]).

Preferred is the use of a capping agent compound as defined above wherein the growth of silver nanowires in said polyol method is conducted at a reaction temperature in a range of from 120° C. to 160° C., wherein preferably a reaction temperature in the range of from 120° C. to 160° C. is maintained for a duration in the range of from 10 min to 120 min, preferably in the range of from 10 min to 60 min, more preferably a reaction temperature in the range of from 140° C. to 160° C. is maintained for a duration in the range of from 10 min to 120 min, preferably in the range of from 10 min to 60 min.

Preferred is the use of a compound as defined above, wherein the compound is a polymer obtainable by polymerizing polymerizable monomers comprising (i) monomers of formula (1)

and (ii) other polymerizable monomers not being monomers of formula (1), wherein the ratio of (i) monomers of formula (1) to (ii) other polymerizable monomers is 1:1 or higher, preferably 1.5:1 or higher.

As the polymer is obtainable by polymerizing more than one monomer species the polymer is a copolymer. The copolymer comprises monomer units based on monomers of formula (1) as well as monomer units based on other polymerizable monomers which are not monomers of formula (1). Such other polymerizable monomers are preferably selected from the group consisting of methyl (meth)acrylate ethyl (meth)acrylate N-vinylpyrrolidon isopropyl (meth)acrylate 2-hydroxyethyl (meth)acrylate N-ethyl-N-phenyl (meth)acrylamide N,N-diethyl (meth)acrylamide 1-[2-propenoyl]piperidine 1-[2-methyl-2-propenoyl]piperidine N-(isopropenyl)pyrrolidon and/or are depicted below:

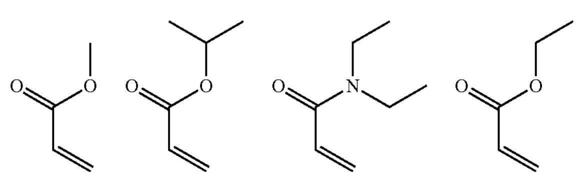

-continued

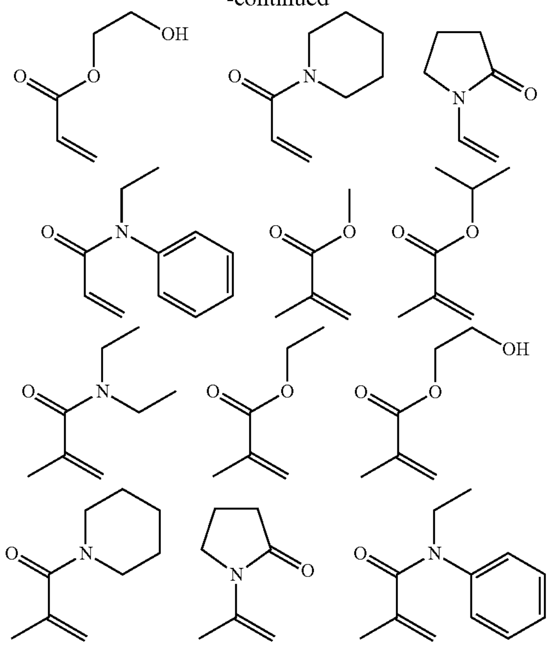

Preferred is the use of a compound as defined above wherein said growth of silver nanowires in a polyol method is conducted in a mixture comprising said capping agent compound, a polyol component, a silver compound, and an oxygen scavenger compound selected from the group consisting of copper compound, iron compound and mixtures thereof.

Herein, the expression "compound as defined above" refers to any of the above definitions, and in particular relates to any definition stated above as being preferred. Preferred compounds are also disclosed in the attached claims and in the list of aspects of the present invention as stated below.

Specifically, the presence of the oxygen scavenger compound is preferred in order to reduce the amount of free $Ag^+$ during the formation of initial seeds and scavenge adsorbed oxygen from the surface of the seeds once formed. In some cases both a copper and an iron compound (i.e. a mixture of a copper compound and an iron compound) can optionally be used in the mixture prepared. Regarding the mechanism it is referred to J. Mater. Chem., 2008, 18, 437-441, FIG. 2, without wishing to be bound by any theory.

Particularly preferred is the use of a compound as defined above, the compound being a polymer obtainable by polymerizing polymerizable monomers comprising (i) monomers of formula (1) (as depicted above)

and (ii) other polymerizable monomers not being monomers of formula (1), wherein the ratio of (i) monomers of formula (1) to (ii) other polymerizable monomers is 1:1 or higher, preferably 1.5:1 or higher, wherein the compound has a weight average molecular weight (MW) in the range of from 8000 to 4 000 000, preferably 20 000 to 2 000 000, more preferably 50 000 to 1 000 000.

The above statements regarding technical effects and advantages apply mutatis mutandis.

Particularly preferred is the use of a compound as defined above, the compound being a polymer obtainable by polymerizing polymerizable monomers comprising (i) monomers of formula (1) (as depicted above) wherein R1 is H or CH3

L is an alkanediyl group having a total number of 1 to 25 carbon atoms, or

—CH2-CH2-(O—CH2-CH2)n-, with n being an integer from 1 to 10

Q is N—R3

Z is O or S or NH

X is O or S or CH2 or NH, and

R2 and R3 together represent an alkanediyl having n carbon atoms wherein n is an integer from 2 to 9, wherein said alkanediyl together with (i) the atom X and (ii) the nitrogen atom of N—R3 forms a heterocyclic ring having n+3 ring atoms and (ii) other polymerizable monomers not being monomers of formula (1), wherein the ratio of (i) monomers of formula (1) to (ii) other polymerizable monomers is 1:1 or higher, preferably 1.5:1 or higher, wherein the compound has a weight average molecular weight (MW) in the range of from 8000 to 4 000 000, preferably 20 000 to 2 000 000, more preferably 50 000 to 1 000 000.

The present invention also relates to a method of making silver nanowires comprising the following steps providing or preparing a capping agent compound which is a polymer obtainable by polymerizing polymerizable monomers comprising monomers of formula (1) as defined above, preparing a mixture comprising said capping agent compound, a polyol component, and a silver compound, and optionally an oxygen scavenger compound selected from the group consisting of copper compound, iron compound and mixtures thereof, allowing said silver compound to react in said mixture with said polyol component, so that said silver nanowires result.

Herein, the expression "monomers of formula (1) as defined above" refers to any of the above definitions, and in particular relates to any definition stated above as being preferred. Preferred monomers of formula (1) are also disclosed in the attached claims and in the list of aspects of the present invention as stated below.

Generally, all aspects of the present invention discussed herein above in the context of the inventive use of a compound as a capping agent apply mutatis mutandis for the method of the present invention. And likewise, all aspects of the inventive method of making silver nanowires discussed herein below apply mutatis mutandis for the inventive use of a compound as a capping agent. The method of the present invention is a polyol method. Regarding the polyol method in general and regarding specific embodiments of such a polyol method it is referred to the patent and non-patent literature discussed above. Specific examples of the method of the present invention are stated below.

Methods of the present invention are preferred wherein a mixture is prepared comprising said capping agent compound,
a polyol component,
a silver compound, and additionally an oxygen scavenger compound selected from the group consisting of copper compound, iron compound and mixtures thereof.

Preferred is a method of the present invention as defined above comprising the following step:

heating the mixture as prepared from a temperature in the range of from 10 to 30° C. to a reaction temperature in the range of from 120 to 160° C. within a period of time not exceeding 2 minutes, preferably within a period of time not exceeding 1 minute.

Surprisingly, it has been found that favorable results are achieved when in an earlier step said mixture comprising said silver compound, said capping agent compound and said polyol component is prepared, and in a subsequent further step the mixture as prepared is very rapidly (within a period of time not exceeding 2 minutes) heated from a temperature in the range of from 10 to 30° C. to a reaction temperature in the range of from 120 to 160° C. Surprisingly, such method design results in a longer average length of the resulting silver nanowires, in comparison with method designs wherein heating is conducted over a longer period of time.

Preferably, in a method according to the present invention said silver compound comprises the salt of an inorganic or organic acid, preferably the salt of an inorganic acid.

More preferably, said silver compound consists of the salt of an inorganic or organic acid and preferably consists of the salt of an inorganic acid.

Said silver salt of an inorganic acid can be selected from the inorganic silver salts available and known in the prior art. However, in the method of the present invention it is preferred that said silver compound consists of one or more compounds selected from the group consisting of silver nitrate,
silver sulfate,
silver sulfamate,
silver chlorate,
silver lactate,
silver acetate,
silver tetraborate,
silver trifluoroacetate,
and
silver perchlorate.

The skilled person will select silver compounds that are stable in the experimental set-up as chosen.

In many cases it is most preferred to select a single silver salt of an inorganic acid from the group defined above so as to facilitate workup and avoid precipitation.

In a preferred method according to the present invention said oxygen scavenger compound (copper compound or iron compound or mixture thereof) comprises the salt of an inorganic or organic acid, preferably the salt of an inorganic acid.

More preferably, said oxygen scavenger compound (copper compound or iron compound or mixture thereof) consists of the salt of an inorganic or organic acid and preferably consists of the salt of an inorganic acid.

The skilled person will select said salt of an inorganic acid from inorganic copper or iron salts (i) available and (ii) known in the prior art. However, in the method of the present invention it is preferred that said oxygen scavenger compound comprises or, preferably, consists of one or more compounds selected from the group consisting of copper chloride
copper acetate
copper bromide
copper iodide
copper fluoride
copper nitrate
copper sulfate
iron chloride
and
iron acetylacetonate.

Herein, the term "copper chloride" includes anhydrous and non-anhydrous copper (I) chloride, anhydrous and non-anhydrous copper (II) chloride, and mixtures thereof.

Herein, the term "copper acetate" includes anhydrous and non-anhydrous copper (I) acetate, anhydrous and non-anhydrous copper (II) acetate, and mixtures thereof.

Herein, the term "copper bromide" includes anhydrous and non-anhydrous copper (I) bromide, anhydrous and non-anhydrous copper (II) bromide, and mixtures thereof.

Herein, the term "copper iodide" includes anhydrous and non-anhydrous copper (I) iodide, anhydrous and non-anhydrous copper (II) iodide, and mixtures thereof.

Herein, the term "copper fluoride" includes anhydrous and non-anhydrous copper (I) fluoride, anhydrous and non-anhydrous copper (II) fluoride, and mixtures thereof.

Herein, the term "copper nitrate" includes anhydrous and non-anhydrous copper (I) nitrate, anhydrous and non-anhydrous copper (II) nitrate, and mixtures thereof.

Herein, the term "copper sulfate" includes anhydrous and non-anhydrous copper (I) sulfate, anhydrous and non-anhydrous copper (II) sulfate, and mixtures thereof.

Herein, the term "iron chloride" includes anhydrous and non-anhydrous iron (II) chloride, anhydrous and non-anhydrous iron (III) chloride, and mixtures thereof.

Herein, the term "iron acetylacetonate" includes anhydrous and non-anhydrous iron (II) AcAc [i.e. bis(acetylacetonato) iron (II)], anhydrous and non-anhydrous iron (III) AcAc [i.e. tris(acetylacetonato) iron(III)], and mixtures thereof.

The skilled person will select copper compounds and/or iron compounds that are stable and effective in the experimental set-up as chosen.

In many cases it is most preferred to select for use as oxygen scavenger compound a single copper or iron salt of an inorganic acid from the group defined above so as to facilitate workup.

Preferably, in a method according to the present invention said silver compound is silver nitrate and said oxygen scavenger compound is copper chloride. In many instances, these compounds possess a superior dissolution rate and a good solubility in premixtures and/or the mixture as prepared. Moreover, the chloride anions of the copper chloride assist in keeping the initial $Ag^+$ concentration low in the mixture as prepared, thus avoiding unfavorable premature nucleation of silver.

In many cases it is preferred in a method according to the present invention that the polyol component comprises (or consists of) one or more aliphatic alcohols having preferably a total number of C atoms in the range of from 2 to 6, and having preferably a total number of hydroxy groups in the range of from 2 to 6. Due to their polarity and favorable low melting points and high boiling points many of these preferred alcohols are liquid in a wide temperature range useful in methods of the present invention. Typically, in a method according to the present invention the polyol component acts as a solvent.

Typically, in a method according to the present invention the polyol component acts as a reducing agent. Without wishing to be bound to any theory, the polyol component is oxidized and the $Ag^+$ cation reduced to $Ag^0$ forming silver nanowires. The function of the polyol component, e.g. the function of a reducing agent, is crucial for the growth of silver nanowires in a polyol method and is described in more detail in the non-patent and patent literature mentioned above.

More preferably, said polyol component comprises or, preferably, consists of one or more compounds selected from the group consisting of:

ethylene glycol,
glucose,
1,2-propanediol,
1,3-propanediol,
and
glycerin.

These compounds, individually and in combination with each other, possess favorable reducing properties.

In many cases it is preferred that the polyol component consists of ethylene glycol. Ethylene glycol is readily available and has a relatively low viscosity facilitating its processing.

Preferably, in a method according to the present invention the polyol component is ethylene glycol (or any other compound from the group of preferred polyol components as defined above), the silver compound is silver nitrate, and said copper compound is copper chloride. Such a polyol component is preferred due to the relatively low viscosity of ethylene glycol and due to the high dissolution rate and solubility of silver nitrate and copper chloride in the solvent ethylene glycol.

In many cases a method according to the present invention is preferred wherein said step of allowing said silver compound to react in said mixture with said polyol component, so that said silver nanowires result, is at least continued until one or more of the resulting silver nanowires have a length along their major axis of 0.5 μm or more, preferably 1 μm or more, more preferably 10 μm or more.

Such silver nanowires having a length of 0.5 μm or more, preferably 1 μm or more, more preferably 10 μm or more, are preferentially used in the fabrication of electrical conductive membranes, circuit lines, conductive fibers, microelectrodes, sensors, conductors in electronic devices, conductors in optical devices, electrodes of liquid crystal displays, electrodes of plasma displays, electrodes of organic electroluminescent displays, electrodes of electronic paper, electrodes of touch panels, electrodes of thin film amorphous silicon solar cells, electrodes of dye sensitized solar cells; electromagnetic shielding materials, and antistatic materials.

Preferably, in the method according to the present invention said step of allowing said silver compound to react in said mixture with said polyol component, so that said silver nanowires result, has a duration in the range of from 10 min to 120 min, preferably in the range of from 10 min to 60 min,
and/or
of less than 120 min, preferably less than 60 min, more preferably less than 30 min, most preferably less than 20 min.

These short reaction times preferably used in methods according to the present invention are particularly helpful as they shorten the overall production.

In many cases a method according to the present invention is preferred wherein in said mixture as prepared the concentration of silver cations, cations of said oxygen scavenger compound (preferably copper), said capping agent compound (as defined above and hereinbelow), and chloride anions is as follows:

from 0.03% to 4% by weight silver cations,
from 0 to 1% by weight, preferably from 0.0001% to 1% by weight, cations of said oxygen scavenger compound,
from 0.1% to 3% by weight of said capping agent compound
and
from 0% to 1%, preferably from 0.0001% to 0.5% by weight of chloride anions, in each case based on the total weight of the mixture as prepared.

The above-mentioned concentrations of the different compounds and components represent the optimum value between the growth rate of the silver nanowires, reaction rates of the redox-cycles involved and post-process work up of the above mentioned method.

In many cases a method according to the present invention is preferred comprising the steps of preparing a capping agent compound by polymerizing polymerizable monomers comprising an amount of monomers of formula (1) as defined above,
preparing a mixture comprising
 said capping agent compound,
 a polyol component,
and
 a silver compound
and optionally
 an oxygen scavenger compound selected from the group consisting of copper compound, iron compound and mixtures thereof,
allowing said silver compound to react in said mixture with said polyol component, so that said silver nanowires result, wherein the molar ratio of the total amount of said monomers of formula (1) to the total amount of silver ions in the mixture as prepared is in the range of from 0.1:1 to 40:1, preferably from 1:1 to 20:1, more preferably from 1:1 to 10:1.

When using a preferred molar ratio of the total amount of said monomers of formula (1) to the total amount of silver ions in the premixture as prepared and as stated above represent, both a high growth rate of the silver nanowires and an easy post-process work up are achieved.

The present invention also relates to a product comprising silver nanowires having adsorbed to their surface a capping agent compound as defined above, wherein preferably the product is obtainable by the method as defined above. Such a product can be identified by separating the silver nanowire from the adsorbed capping agent compound by means of a desorption treatment comprising contacting the silver nanowires having adsorbed to their surface a capping agent compound with a suitable solvent, and heating the resulting mixture so that the capping agent compound is desorbed from the silver nanowire surface and is dissolved in the solvent, and (b) analyzing the resulting solution of said capping agent compound in said solvent by means of NMR, (GC-)MS or the like.

Without wishing to be bound by any theory the present invention relates to a product (preferably obtainable by the method of the present invention) comprising silver nanowires, wherein the capping agent compound as defined above is adsorbed on the surface of said silver nanowires, preferably adsorbed on the surface of said silver nanowires via one or more of the atoms Z of the capping agent compound, more preferably adsorbed on the surface of said silver nanowires via a covalent bond between one or more atoms Z and one or more silver atoms of said silver nanowires, and even more preferably adsorbed on the surface of said silver nanowires via a (preferably covalent) bond between one or more atoms Z and one or more silver atoms on the 100 crystal phase of said silver nanowires. For descriptions and theories of adsorption of capping agent compounds to silver surfaces see Huang et al. (*Langmuir,* 12, 1996, 909-912).

Preferably, the product according to the present invention is selected from the group consisting of electrical conductive membranes, circuit lines, conductive fibers, microelectrodes, sensors, conductors in electronic devices, conductors in optical devices, electrodes of liquid crystal displays, electrodes of plasma displays, electrodes of organic electroluminescent displays, electrodes of electronic paper, electrodes of touch panels, electrodes of thin film amorphous silicon solar cells, electrodes of dye sensitized solar cells; electromagnetic shielding materials, antistatic materials.

Specific aspects of the invention are summarized as follows:

1. Use of a compound as a capping agent for controlling or modifying the growth of silver nanowires in a polyol method, the compound being a polymer obtainable by polymerizing polymerizable monomers comprising monomers of formula (1)

(1)

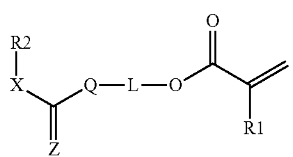

wherein
   - R1 is H or $CH_3$
   - L is a linking group having a total number of 1 to 25 carbon atoms and a total number of 0 to 10 oxygen atoms
   - Q is O or S or N—R3
   - Z is O or S or NH
   - X is O or S or $CH_2$ or NH, and
   - R2 and R3
     - are independently of each other
       - hydrogen,
       - a substituted alkyl having a total number of 1 to 25 carbon atoms and a total number of 0 to 5 heteroatoms
     - or
       - unsubstituted alkyl having a total number of 1 to 25 carbon,
   - or
     - together represent an alkanediyl having n carbon atoms wherein n is an integer from 2 to 9, wherein said alkanediyl together with (i) the atom X and (ii) the nitrogen atom of N—R3 forms a heterocyclic ring having n+3 ring atoms.

2. Use of a compound according to aspect 1,
   wherein linking group L is
   - an alkanediyl group having a total number of 1 to 25 carbon atoms,
   or
   - $—CH_2—CH_2—(O—CH_2—CH_2)_n—$, with n being an integer from 1 to 10.
3. Use of a compound according to any of the preceding aspects,
   wherein the linking group L is
   - an alkanediyl group selected from the group consisting of
     - $—CH_2—$
     - $—CH_2—CH_2—$
     - $—C(CH_3)H—CH_2—$
     - $—CH_2—C(CH_3)H—$
     - $—C(CH_3)H—C(CH_3)H—$
     - $—CH_2—CH_2—CH_2—$
   - and
     - $—CH_2—CH_2—CH_2—CH_2—$
   or is
   - $—CH_2—CH_2—(O—CH_2—CH_2)_n—$, with n being an integer in the range of from 1 to 6, preferably 1 to 3.
4. Use of a compound according to any of the preceding aspects, wherein
   Q is N—R3.
5. Use of a compound according to aspect 4, wherein
   R2 and R3 together represent an alkanediyl having n carbon atoms wherein n is an integer from 2 to 9, wherein said alkanediyl together with (i) the atom X and (ii) the nitrogen atom of N—R3 forms a heterocyclic ring having n+3 ring atoms.
6. Use of a compound according to any of the preceding aspects,
   wherein
   - the linking group L is
     - an alkanediyl group selected from the group consisting of
       - $—CH_2—$
       - $—CH_2—CH_2—$
       - $—C(CH_3)H—CH_2—$
       - $—CH_2—C(CH_3)H—$
       - $—C(CH_3)H—C(CH_3)H—$
       - $—CH_2—CH_2—CH_2—$
     - and
       - $—CH_2—CH_2—CH_2—CH_2—$
   - or is
     - $—CH_2—CH_2—(O—CH_2—CH_2)_n—$, with n being an integer from 1 to 3,
   - Q is N—R3, and
   - R2 and R3 together represent an alkanediyl having n carbon atoms wherein n is an integer from 2 to 9, wherein said alkanediyl together with (i) the atom X and (ii) the nitrogen atom of N—R3 forms a heterocyclic ring having n+3 ring atoms.
7. Use of a compound according to any of the preceding aspects, wherein
   Z is O.
8. Use of a compound according to any of the preceding aspects, wherein
   X is O or $CH_2$ or NH.

9. Use of a compound according to any of the preceding aspects, wherein
   R1 is H or $CH_3$
   linking group L is
   an alkanediyl group selected from the group consisting of
   —$CH_2$—
   —$CH_2$—$CH_2$—
   —$C(CH_3)H$—$CH_2$—
   —$CH_2$—$C(CH_3)H$—
   —$C(CH_3)H$—$C(CH_3)H$—
   —$CH_2$—$CH_2$—$CH_2$—
   and
   —$CH_2$—$CH_2$—$CH_2$—$CH_2$—
   or is
   —$CH_2$—$CH_2$—(O—$CH_2$—$CH_2$)$_n$—, with n being an integer from 1 to 3,
   Q is N—R3,
   R2 and R3 together represent an alkanediyl having n carbon atoms wherein n is an integer from 2 to 9, wherein said alkanediyl together with (i) the atom X and (ii) the nitrogen atom of N—R3 forms a heterocyclic ring having n+3 ring atoms,
   Z is O, and
   X is O or $CH_2$ or NH.
10. Use of a compound according to any of the preceding aspects, wherein
   R1 is H or $CH_3$
   linking group L is
   an alkanediyl group selected from the group consisting of
   —$CH_2$—
   —$CH_2$—$CH_2$—
   —$C(CH_3)H$—$CH_2$—
   —$CH_2$—$C(CH_3)H$—
   —$C(CH_3)H$—$C(CH_3)H$—
   —$CH_2$—$CH_2$—$CH_2$—
   and
   —$CH_2$—$CH_2$—$CH_2$—$CH_2$—
   or is
   —$CH_2$—$CH_2$—(O—$CH_2$—$CH_2$)$_n$—, with n being an integer from 1 to 3,
   Q is N—R3,
   R2 and R3 together represent ethanediyl, wherein said ethanediyl together with (i) the atom X and (ii) the nitrogen atom of N—R3 forms a heterocyclic ring having 5 ring atoms,
   Z is O, and
   X is O or $CH_2$ or NH.
11. Use of a compound according to any of the preceding aspects, wherein
   R1 is H or $CH_3$
   linking group L is
   —$CH_2$—$CH_2$—
   or
   —$CH_2$—$CH_2$—(O—$CH_2$—$CH_2$)$_n$—, with n being an integer from 1 to 3,
   Q is N—R3,
   R2 and R3 together represent ethanediyl, wherein said ethanediyl together with (i) the atom X and (ii) the nitrogen atom of N—R3 forms a heterocyclic ring having 5 ring atoms,
   Z is O, and
   X is O or $CH_2$ or NH.
12. Use of a compound according to any of the preceding aspects, the compound being a polymer obtainable by polymerizing polymerizable monomers comprising one or more monomers of formula (1) selected from the group consisting of:

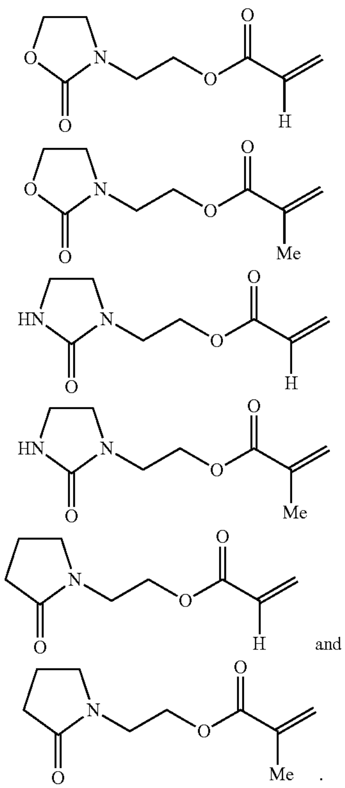

13. Use of a compound according to any of the preceding aspects wherein the capping agent compound has a weight average molecular weight ($M_W$) in the range of from 8000 to 4 000 000, preferably 20 000 to 2 000 000, more preferably 50 000 to 1 000 000.
14. Use of a compound according to any of the preceding aspects wherein the growth of silver nanowires in said polyol method is conducted at a reaction temperature in the range of from 120° C. to 160° C.,
   wherein preferably
   a reaction temperature in the range of from 120° C. to 160° C. is maintained for a duration in the range of from 10 min to 120 min, preferably in the range of from 10 min to 60 min,
   more preferably
   a reaction temperature in the range of from 140° C. to 160° C. is maintained for a duration in the range of from 10 min to 120 min, preferably in the range of from 10 min to 60 min.
15. Use of a compound according to any of the preceding aspects, the compound being a polymer obtainable by polymerizing polymerizable monomers comprising
   (i) monomers of formula (1)
   and
   (ii) other polymerizable monomers not being monomers of formula (1),
   wherein the ratio of (i) monomers of formula (1) to (ii) other polymerizable monomers is 1:1 or higher, preferably 1.5:1 or higher.
16. Use of a compound according to any of the preceding aspects, the compound being a polymer obtainable by polymerizing polymerizable monomers comprising (i) monomers of formula (1)

and (ii) other polymerizable monomers not being monomers of formula (1), wherein the ratio of (i) monomers of formula (1) to (ii) other polymerizable monomers is 1:1 or higher, preferably 1.5:1 or higher, wherein the compound has a weight average molecular weight ($M_W$) in the range of from 8000 to 4 000 000, preferably 20 000 to 2 000 000, more preferably 50 000 to 1 000 000.

17. Use according to any of the preceding aspects, the compound being a polymer obtainable by polymerizing polymerizable monomers comprising (i) monomers of formula (1)

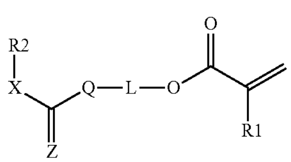

(1)

wherein

R1 is H or $CH_3$

L is an alkanediyl group having a total number of 1 to 25 carbon atoms, or

—$CH_2$—$CH_2$—(O—$CH_2$—$CH_2$)$_n$—, with n being an integer from 1 to 10

Q is N—R3

Z is O or S or NH

X is O or S or $CH_2$ or NH, and

R2 and R3 together represent an alkanediyl having n carbon atoms wherein n is an integer from 2 to 9, wherein said alkanediyl together with (i) the atom X and (ii) the nitrogen atom of N—R3 forms a heterocyclic ring having n+3 ring atoms and (ii) other polymerizable monomers not being monomers of formula (1), wherein the ratio of (i) monomers of formula (1) to (ii) other polymerizable monomers is 1:1 or higher, preferably 1.5:1 or higher, wherein the compound has a weight average molecular weight ($M_W$) in the range of from 8000 to 4 000 000, preferably 20 000 to 2 000 000, more preferably 50 000 to 1 000 000.

18. Use of a compound according to any of the preceding aspects wherein said growth of silver nanowires in a polyol method is conducted in a mixture comprising said capping agent compound, a polyol component, a silver compound, and an oxygen scavenger compound selected from the group consisting of copper compound, iron compound and mixtures thereof.

19. Method of making silver nanowires comprising the following steps providing or preparing a capping agent compound which is a polymer obtainable by polymerizing polymerizable monomers comprising monomers of formula (1) as defined in any of aspects 1 to 13, preparing a mixture comprising said capping agent compound, a polyol component, and a silver compound, and optionally an oxygen scavenger compound selected from the group consisting of copper compound, iron compound and mixtures thereof, allowing said silver compound to react in said mixture with said polyol component, so that said silver nanowires result.

20. Method according to aspect 19, comprising the following step:

heating the mixture as prepared from a temperature in the range of from 10 to 30° C. to a reaction temperature in the range of from 120 to 160° C. within a period of time not exceeding 2 minutes, preferably within a period of time not exceeding 1 minute.

21. Method according to any of aspects 19 to 20, wherein said silver compound comprises the salt of an inorganic or organic acid, preferably the salt of an inorganic acid.

22. Method according to any of aspects 19 to 21, wherein said silver compound consists of one or more compounds selected from the group consisting of silver nitrate, silver sulfate, silver sulfamate, silver chlorate, silver lactate, silver acetate, silver tetraborate, silver trifluoroacetate, and silver perchlorate.

23. Method according to any of aspects 19 to 22, wherein said oxygen scavenger compound comprises the salt of an inorganic or organic acid, preferably the salt of an inorganic acid.

24. Method according to any of aspects 19 to 23, wherein said oxygen scavenger compound consists of one or more compounds selected from the group consisting of copper chloride, copper acetate, copper bromide, copper iodide, copper fluoride, copper nitrate, copper sulfate, iron chloride, and iron acetylacetonate.

25. Method according to any of aspects 19 to 24, wherein said silver compound is silver nitrate and said oxygen scavenger compound is copper chloride.

26. Method according to any of aspects 19 to 25, wherein the polyol component comprises one or more compounds selected from the group consisting of ethylene glycol, glucose, 1,2-propanediol, 1,3-propanediol, and glycerin, wherein the polyol component preferably comprises ethylene glycol.

27. Method according to any of aspects 19 to 26, wherein the polyol component comprises ethylene glycol, the silver compound is silver nitrate and said copper compound is copper chloride.
28. Method according to any of aspects 19 to 27, wherein said step of allowing said silver compound to react in said mixture with said polyol component, so that said silver nanowires result, is at least continued until one or more of the resulting silver nanowires have a length along their major axis of 0.5 μm or more, preferably 1 μm or more, more preferably 10 μm or more.
29. Method according to any of aspects 19 to 28 wherein said step of allowing said silver compound to react in said mixture with said polyol component, so that said silver nanowires result, has a duration
    in the range of from 10 min to 120 min, preferably in the range of from 10 min to 60 min, and/or of less than 120 min, preferably less than 60 min, more preferably less than 30 min, most preferably less than 20 min.
30. Method according to any of aspects 19 to 29, wherein in said mixture as prepared the concentration of silver cations, cations of said oxygen scavenger compound, said capping agent compound, and chloride anions is as follows:
    from 0.03% to 4% by weight silver cations,
    from 0.0001% to 1% by weight cations of said oxygen scavenger compound,
    from 0.1% to 3% by weight of said capping agent compound
    and
    from 0% to 1%, preferably from 0.0001% to 0.5% by weight of chloride anions, in each case based on the total weight of the mixture as prepared.

31. Method according to any of aspects 19 to 30, comprising the step of
    preparing a capping agent compound by polymerizing polymerizable monomers comprising an amount of monomers of formula (1) as defined in any of aspects 1 to 13,
    preparing a mixture comprising
        said capping agent compound,
        a polyol component,
    and
        a silver compound
    and optionally
        an oxygen scavenger compound selected from the group consisting of copper compound, iron compound and mixtures thereof,
    allowing said silver compound to react in said mixture with said polyol component, so that said silver nanowires result, wherein the molar ratio of the total amount of said monomers of formula (1) to the total amount of silver ions in the mixture as prepared is in the range of from 0.1:1 to 40:1, preferably from 1:1 to 20:1, more preferably from 1:1 to 10:1.

32. Product comprising silver nanowires having adsorbed to their surface a capping agent compound as defined in any of aspects 1 to 13, wherein preferably the product is obtainable by the method of any of aspects 19 to 31.
33. Product according to aspect 32, wherein the product is selected from the group consisting of electrical conductive membranes, circuit lines, conductive fibers, microelectrodes, sensors, conductors in electronic devices, conductors in optical devices, electrodes of liquid crystal displays, electrodes of plasma displays, electrodes of organic electroluminescent displays, electrodes of electronic paper, electrodes of touch panels, electrodes of thin film amorphous silicon solar cells, electrodes of dye sensitized solar cells; electromagnetic shielding materials, antistatic materials.

The present invention is further described by the following examples with reference to the attached figures.

FIGURES

FIG. 1*a* is an optical microscopy image of silver nanowires synthesized according to example 1 d).

Figure 1B:
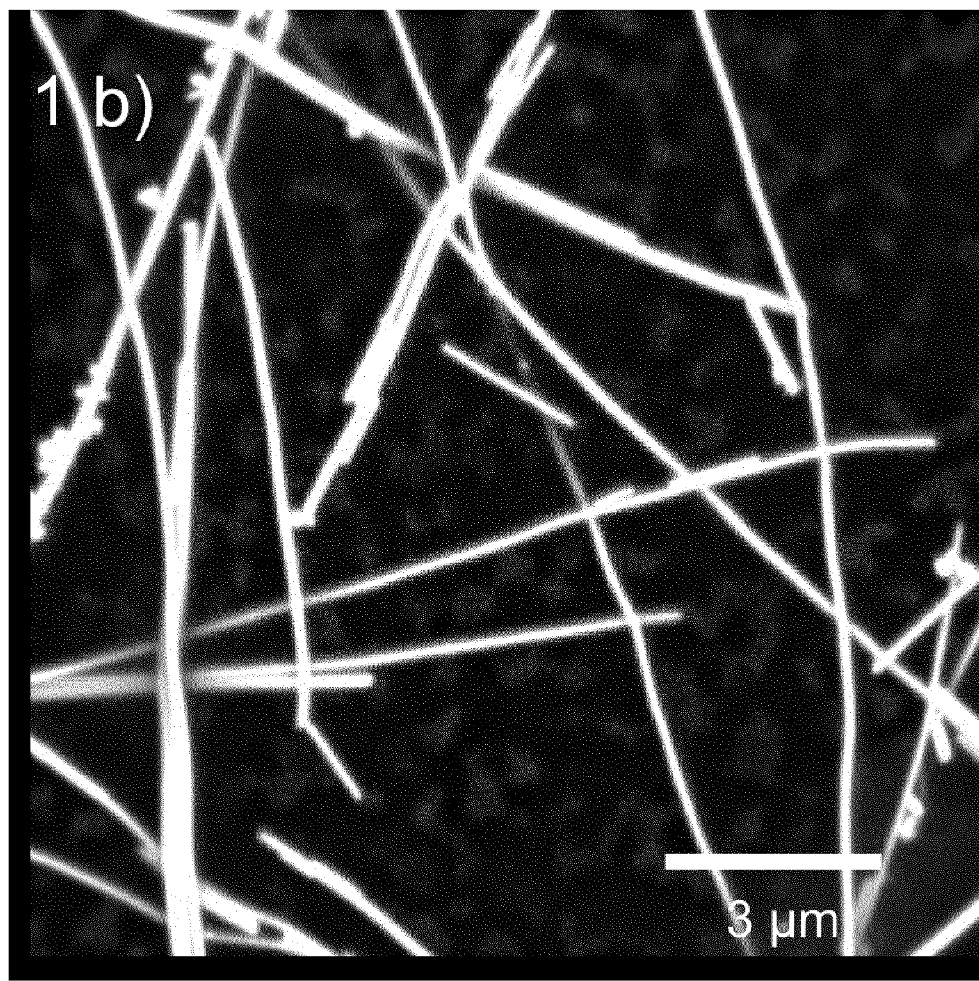

FIG. 1*b* is an optical microscopy image of silver nanowires synthesized according to example 1 d) at a higher magnification than FIG. 1*a*.

Figure 2A:
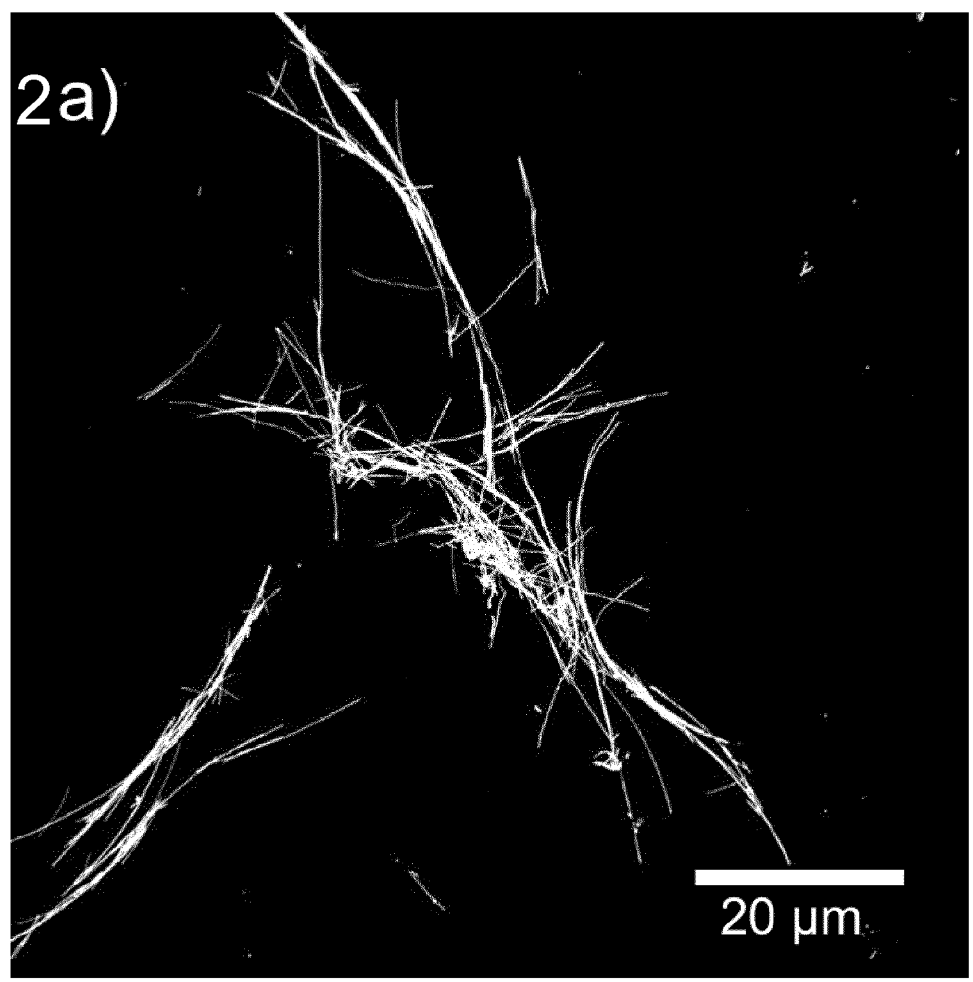

FIG. 2*a* is an optical microscopy image of silver nanowires synthesized according to example 2.

Figure 2B:
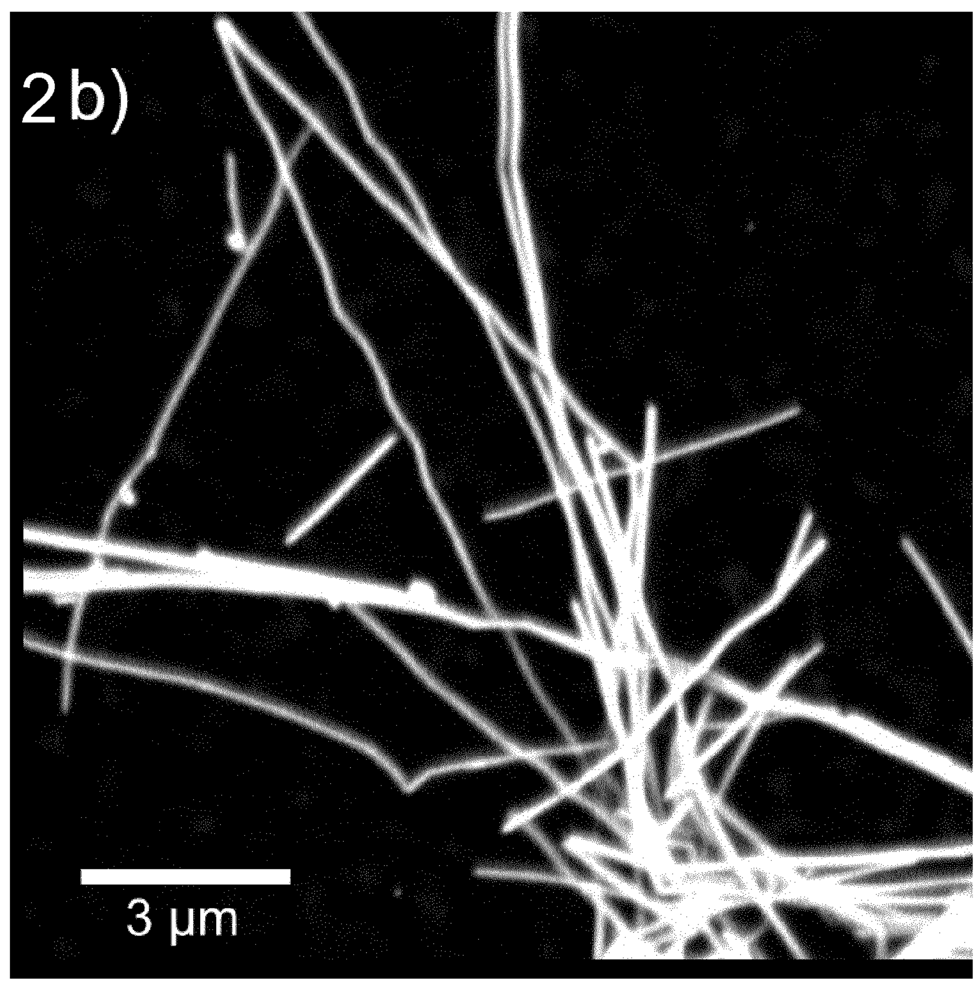

FIG. 2*b* is an optical microscopy image of silver nanowires synthesized according to example 2 at a higher magnification than FIG. 2*a*.

Figure 3A:
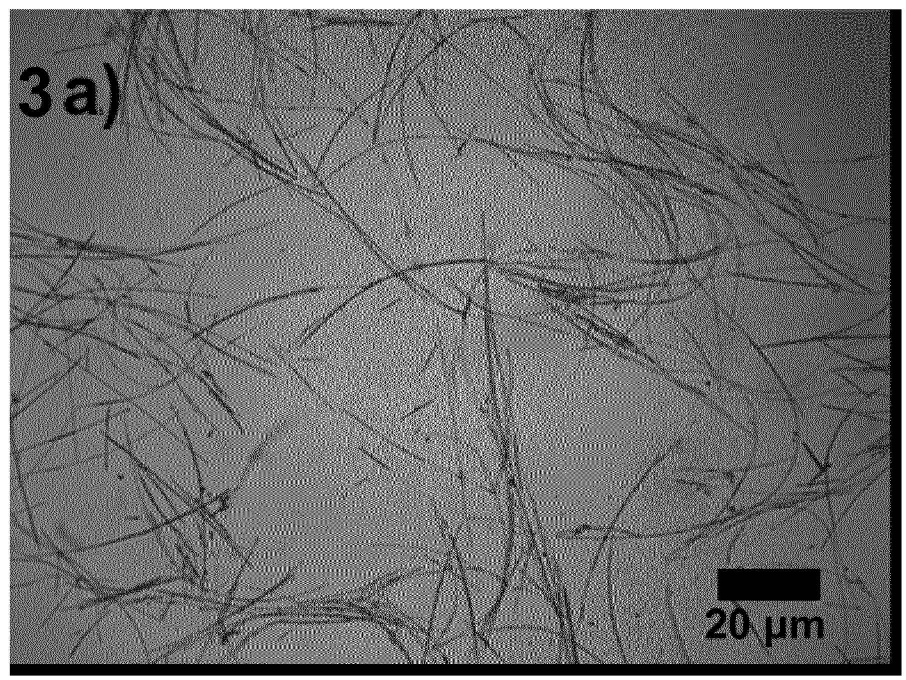

FIG. 3*a* is an optical microscopy image of silver nanowires synthesized according to example 3 a).

Figure 3B:
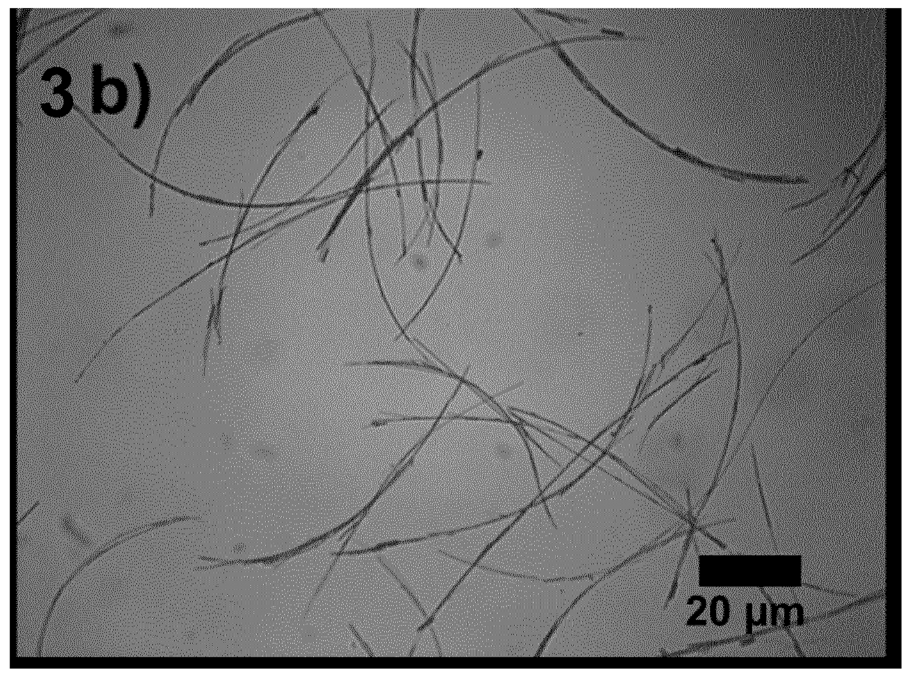

FIG. 3*b* is an optical microscopy image of silver nanowires synthesized according to example 3 c).

Figure 3C:
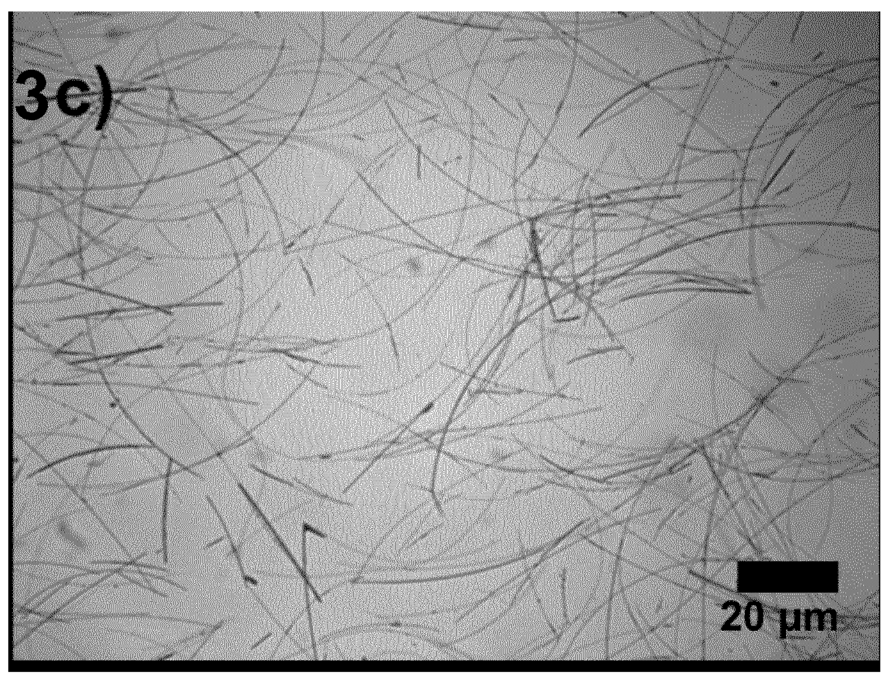

FIG. 3*c* is an optical microscopy image of silver nanowires synthesized according to example 3 f).

EXAMPLES

Definition of Abbreviations

PEA: N-pyrrolidonyl-ethyl-acrylate

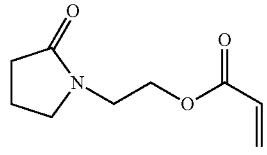

PEMA: N-pyrrolidonyl-ethyl-methacrylate

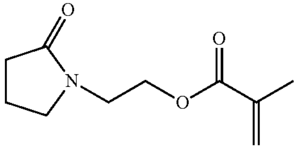

PolyPEA: Polymer of N-pyrrolidonyl-ethyl-acrylate ($M_n$: 23 200, $M_w$: 286 000)

PolyPEMA: Polymer of N-pyrrolidonyl-ethyl-methacrylate ($M_n$: 12 900, $M_w$: 41 900)

EG: ethylene glycol $M_n$: number average molar mass as determined by means of size exclusion chromatography $M_w$: mass average molar mass as determined by means of size exclusion chromatography Example 1: Preparation of Silver Nanowires Using polyPEA as Capping Agent Compound with Varying Silver Nitrate Concentration and with Copper (II) Chloride as Oxygen Scavenger Compound 5487 μl of a polyPEA-EG solution were prepared (having a concentration of 72 mM in terms of PEA repeat units, i.e. comprising an amount of polyPEA corresponding to 0.395 mmol of PEA monomers).

Five different amounts of silver nitrate as specified in Table 1, below, were each dissolved in a solution as prepared above resulting in solutions having different ratios of Ag/polyPEA. The corresponding examples are designated example 1 a), 1 b), 1 c), 1 d), and 1 e), respectively (see Table 1).

To each of these solutions having a specific ratio of Ag/polyPEA 140 μl of a 4 mM copper (II) chloride solution in EG was added, to give five different mixtures.

Each of the resulting mixtures was stirred in a reaction vessel to form a clear solution and then heated to 160° C. and maintained at this temperature while stirring with 150 rpm for 15 min, in order to allow silver nanowires to grow within the reaction mixture.

Each of the reactions was quenched by cooling down the corresponding reaction vessel including the corresponding reaction mixture in a water bath having ambient temperature.

[Note: According to analysis, in each example 1 a) to 1 e), polyPEA was adsorbed to the surface of the silver nanowires grown. Thus, the respective product as analyzed was a product comprising silver nanowires having adsorbed to their surface polyPEA.]

The silver nanowires were in each case separated from the liquid phase of the reaction mixture, then washed with acetone and ethanol, and then collected by centrifuging at 2000 rpm for 10 min followed by removing the liquid phase.

Finally and in each case, the silver nanowires as collected were re-dispersed in ethanol.

The different parameters were:

TABLE 1

| | Example | | | | |
|---|---|---|---|---|---|
| | 1 a) | 1 b) | 1 c) | 1 d) | 1 e) |
| volume of polyPEA-EG-solution | 5487 μl | 5487 μl | 5487 μl | 5487 μl | 5487 μl |
| amount of PEA repeat units | 0.395 mmol | 0.395 mmol | 0.395 mmol | 0.395 mmol | 0.395 mmol |
| amount of $AgNO_3$ | 2 mg | 10 mg | 25 mg | 50 mg | 250 mg |
| molar ratio of Ag to PEA repeat units | 3:100 | 3:20 | 3:8 | 3:4 | 15:4 |

The silver nanowires synthesized according to example 1 d) had a diameter of about 130 nm and an average length of about 50 μm. This diameter and this length are preferred.

Images of the silver nanowires synthesized according to example 1 d) are attached as FIG. 1*a* and FIG. 1*b*. These figures show optical microscopy images of the silver nanowires synthesized according to example 1 d) at different magnifications. FIG. 1*a* and FIG. 1*b* show a number of silver nanowires which is high in comparison with the number of silver particles also produced.

The results of examples 1 b) and 1 c) were similar to the result of example 1 d).

However, under the experimental conditions of examples 1 a) and 1 e) a respective product mixture was obtained that comprised an amount of silver nanowires and a high amount of other silver particles. These products are not considered to be particularly preferred.

Thus, the appropriate amount of $AgNO_3$ and the appropriate molar ratio of Ag to PEA repeat units appear to have a significant effect on the quality of the silver product mixture obtained. For correspondingly preferred molar ratios of the total amount of monomers of formula (1) (i.e., PEA in example 1) to the total amount of silver ions in the mixture as prepared see the description above.

Example 2: Preparation of Silver Nanowires Using polyPEA as Capping Agent Compound with Copper (I) Chloride as Oxygen Scavenger Compound 5487 μl of a polyPEA-EG solution were prepared (having a concentration of 72 mM in terms of PEA repeat units, i.e. comprising an amount of polyPEA corresponding to 0.395 mmol of PEA monomers).

50 mg silver nitrate were dissolved in the polyPEA-EG solution as prepared, to give a solution.

To this solution 140 μl of a EG mixture were added having a concentration of copper (I) chloride of 4 mM and a concentration of sodium chloride of 4 mM, to give a mixture.

The mixture was stirred in a reaction vessel to form a clear solution and then heated to 160° C. and maintained at this temperature while purging with $N_2$ and stirring with 150 rpm for 15 min, in order to allow silver nanowires to grow within the reaction mixture.

The reaction was quenched by cooling down the reaction vessel including the reaction mixture in a water bath having ambient temperature.

[Note: According to analysis, polyPEA was adsorbed to the surface of the silver nanowires grown. Thus, the product as analyzed was a product comprising silver nanowires having adsorbed to their surface polyPEA.]

The silver nanowires were separated from the liquid phase of the reaction mixture, then washed with acetone and ethanol, and then collected by centrifuging at 2000 rpm for 10 min followed by removing the liquid phase.

Finally, the silver nanowires as collected were re-dispersed in ethanol.

The silver nanowires synthesized according to the above protocol had a diameter of about 100 nm and average length of about 30 μm.

Optical microscopy images of the silver nanowires synthesized according to example 2 are attached as FIGS. 2*a* and 2*b*.

Example 3: Preparation of Silver Nanowires Using polyPEA as Capping Agent Compound at Different Reaction Temperature/Reaction Time Combinations, with Copper (II) Chloride as Oxygen Scavenger Compound 5487 μl of a polyPEA-EG solution were prepared (having a concentration of 72 mM in terms of PEA repeat units, i.e. comprising an amount of polyPEA corresponding to 0.395 mmol of PEA monomers).

50 mg silver nitrate were dissolved in the polyPEA-EG solution as prepared, to give a solution.

To this solution 140 μl of a 4 mM copper (II) chloride solution in EG were added, to give a mixture designated as example 3 a).

The procedure above was repeated five times to give corresponding mixtures designated as examples 3 b), 3 c), 3 d), 3 e), and 3 f).

The six mixtures as prepared above (for example 3 a) to 3 f)) were each stirred in a reaction vessel to form clear solutions and then heated to the corresponding temperatures (according to Table 2), and maintained at this temperature while stirring with 150 rpm for the corresponding period (see Table 2), in order to allow silver nanowires to grow within the corresponding reaction mixture.

TABLE 2

| | Example | | | | | |
|---|---|---|---|---|---|---|
| | 3 a) | 3 b) | 3 c) | 3 d) | 3 e) | 3 f) |
| reaction temperature (° C.) | 160 | 160 | 140 | 140 | 120 | 120 |
| reaction time (min) | 10 | 120 | 40 | 120 | 210 | 360 |

Each of the reactions was quenched by cooling down the corresponding reaction vessel including the corresponding reaction mixture in a water bath having ambient temperature.

[Note: According to analysis, in each example 3 a) to 3 f), polyPEA was adsorbed to the surface of the silver nanowires grown. Thus, the product as analyzed was a product comprising silver nanowires having adsorbed to their surface polyPEA.]

In each case, the silver nanowires were separated from the liquid phase of the reaction mixture, then washed with acetone and ethanol, and then collected by centrifuging at 2000 rpm for 10 min followed by removing the liquid phase.

Finally and in each case, the silver nanowires as collected were re-dispersed in ethanol.

Images of the silver nanowires synthesized according to example 3 a), 3 c), and 3 f) are attached as FIG. 3*a*, FIG. 3*b*, and FIG. 3*c*, respectively. FIG. 3*a*, FIG. 3*b*, and FIG. 3*c* show a number of silver nanowires which is high in comparison with the number of silver particles also produced.

Example 4: Preparation of Silver Nanowires Using polyPEMA as Capping Agent Compound, with Copper (II) Chloride as Oxygen Scavenger Compound 5487 μl of a polyPEMA-EG solution were prepared (having a concentration of 72 mM in terms of PEMA repeat units, i.e. comprising an amount of polyPEMA corresponding to 0.395 mmol of PEMA monomers).

50 mg silver nitrate were dissolved in the polyPEMA-EG solution as prepared, to give a solution.

To this solution 140 μl of a 4 mM copper (II) chloride solution in EG were added, to give a mixture.

This mixture was stirred in a reaction vessel to form a clear solution and then heated to 160° C. and maintained at this temperature while stirring with 150 rpm for 30 min, in order to allow silver nanowires to grow within the reaction mixture.

The reaction was quenched by cooling down the reaction vessel including the reaction mixture in a water bath having ambient temperature.

[Note: According to analysis, polyPEMA was adsorbed to the surface of the silver nanowires grown. Thus, the product as analyzed was a product comprising silver nanowires having adsorbed to their surface polyPEMA.]

The silver nanowires were separated from the liquid phase of the reaction mixture, then washed with acetone and ethanol, and then collected by centrifuging at 2000 rpm for 10 min followed by removing the liquid phase.

Finally, the silver nanowires as collected were re-dispersed in ethanol.

Example 5: Preparation of Silver Nanowires Using as Capping Agent Compound a Co-Polymer Having Repeat Units of (i) PEA and (ii) 2-Hydroxyethyl Acrylate 5487 μl of an ethylene glycol solution containing a co-polymer having repeat units of (i) PEA and (ii) 2-hydroxyethyl acrylate were prepared ((i) having a concentration of 72 mM in terms of PEA repeat units, i.e. comprising an amount of co-polymerized PEA corresponding to 0.395 mmol of PEA monomers, and (ii) having a concentration of 72 mM in terms of 2-hydroxyethyl acrylate repeat units, i.e. comprising an amount of co-polymerized 2-hydroxyethyl acrylate corresponding to 0.395 mmol of 2-hydroxyethyl acrylate monomers).

50 mg silver nitrate were dissolved in the above mentioned ethylene glycol solution, to give a solution.

To this solution 140 μl of a 4 mM copper (II) chloride solution in EG were added, to give a mixture.

This mixture was stirred in a reaction vessel to form a clear solution and then heated to 160° C. and maintained at this temperature while stirring with 150 rpm for 15 min, in order to allow silver nanowires to grow within the reaction mixture.

The reaction was quenched by cooling down the reaction vessel including the reaction mixture in a water bath having ambient temperature.

[Note: According to analysis, co-polymers with repeat units of PEA and 2-hydroxyethyl acrylate were adsorbed to the surface of the silver nanowires grown. Thus, the product as analyzed was a product comprising silver nanowires having adsorbed to their surface co-polymers with repeat units of PEA and 2-hydroxyethyl acrylate.]

The silver nanowires were separated from the liquid phase of the reaction mixture, then washed with acetone and ethanol, and then collected by centrifuging at 2000 rpm for 10 min followed by removing the liquid phase.

Finally, the silver nanowires as collected were re-dispersed in ethanol.

The invention claimed is:

1. A method for controlling or modifying growth of silver nanowires in a polyol method, comprising:

using, as a capping agent, a polymer obtained by polymerizing polymerizable monomers comprising a monomer of formula (1)

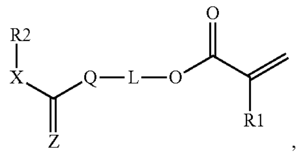

wherein

R1 is H or $CH_3$

L is a linking group having a total number of 1 to 25 carbon atoms and a total number of 0 to 10 oxygen atoms Q is O or S or N—R3

Z is O or S or NH

X is O or S or $CH_2$ or NH, and

R2 and R3 are independently of each other hydrogen, a substituted alkyl having a total number of 1 to 25 carbon atoms and a total number of 0 to 5 heteroatoms, or an unsubstituted alkyl having a total number of 1 to 25 carbon, or R2 and R3 together represent an alkanediyl having n carbon atoms wherein n is an integer from 2 to 9, wherein said alkanediyl together with the atom X and the nitrogen atom of N—R3 forms a heterocyclic ring having n+3 ring atoms.

2. The method of claim 1, wherein the linking group L is an alkanediyl group having a total number of 1 to 25 carbon atoms, or $—CH_2—CH_2—(O—CH_2—CH_2)_n—$, with n being an integer from 1 to 10, and/or Q is N—R3.

3. The method of claim 2, wherein

Q is N—R3 and

R2 and R3 together represent an alkanediyl having n carbon atoms wherein n is an integer from 2 to 9, wherein said alkanediyl together with the atom X and the nitrogen atom of N—R3 forms a heterocyclic ring having n+3 ring atoms.

4. The method of claim 1, wherein

Z is O and/or

X is O or $CH_2$ or NH.

5. The method of claim 1, wherein the linking group L is an alkanediyl group selected from the group consisting of $—CH_2—$, $—CH_2—CH_2—$, $—C(CH_3)H—CH_2—$, $—CH_2—C(CH_3)H—$, $—C(CH_3)H—C(CH_3)H—$, $—CH_2—CH_2—CH_2—$, and $—CH_2—CH_2—CH_2—CH_2—$, or is $—CH_2—CH_2—(O—CH_2—CH_2)_n—$, with n being an integer from 1 to 3, Q is N—R3, R2 and R3 together represent an alkanediyl having n carbon atoms wherein n is an integer from 2 to 9, wherein said alkanediyl together with the atom X and the nitrogen atom of N—R3 forms a heterocyclic ring having n+3 ring atoms, Z is O, and X is O or $CH_2$ or NH.

6. The method of claim 1, wherein the linking group L is $—CH_2—CH_2—$, or $—CH_2—CH_2—(O—CH_2—CH_2)_n—$, with n being an integer from 1 to 3, Q is N—R3, R2 and R3 together represent ethanediyl, wherein said ethanediyl together with the atom X and the nitrogen atom of N—R3 forms a heterocyclic ring having 5 ring atoms, Z is O, and X is O or $CH_2$ or NH.

7. The method of claim 1, wherein the monomer of formula (1) is selected from the group consisting of:

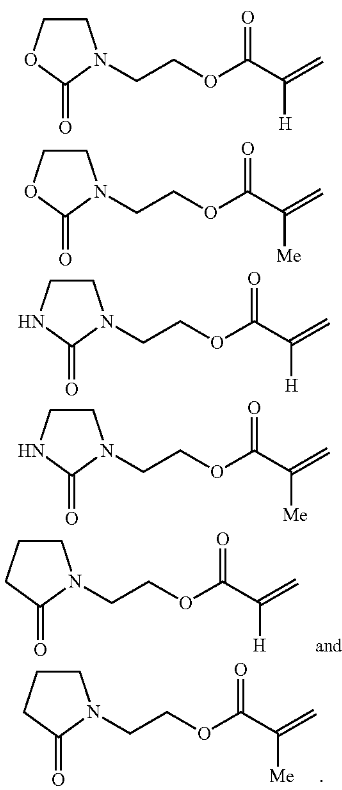

8. The method of claim 1, wherein the polymer used as the capping agent compound has a weight average molecular weight ($M_W$) in a range of from 8000 to 4 000 000.

9. The method of claim 1, wherein said growth of silver nanowires in a polyol method is conducted in a mixture comprising said polymer used as the capping agent, a polyol component, a silver compound, and an oxygen scavenger compound selected from the group consisting of a copper compound, an iron compound and a combination thereof.

10. The method of claim 1, wherein the polymer used as the capping agent is obtained by polymerizing the polymerizable monomers comprising (i) the monomer of formula (1)

and (ii) other polymerizable monomers different from the monomer of formula (1), wherein a ratio of the monomer of formula (1) to the other polymerizable monomers is 1:1 or higher.

11. The method of claim 10, wherein the polymer used as the capping agent has a weight average molecular weight ($M_W$) in a range of from 8000 to 4 000 00.

12. The method of claim 1, wherein the polymer used as the capping agent is obtained by polymerizing the polymerizable monomers comprising (i) the monomer of formula (1)

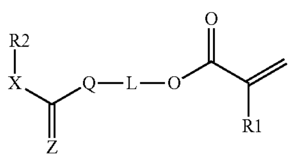

wherein

L is an alkanediyl group having a total number of 1 to 25 carbon atoms, or $—CH_2—CH_2—(O—CH_2—CH_2)_n—$, with n being an integer from 1 to 10

Q is N—R3, and

R2 and R3 together represent an alkanediyl having n carbon atoms wherein n is an integer from 2 to 9, wherein said alkanediyl together with the atom X and the nitrogen atom of N—R3 forms a heterocyclic ring having n+3 ring atoms, and (ii) other polymerizable monomers different from the monomer of formula (1), wherein a ratio of the monomer of formula (1) to the other polymerizable monomers is 1:1 or higher, and wherein the polymer used as the capping agent has a weight average molecular weight ($M_W$) in a range of from 8000 to 4 000 000.

13. A method of making silver nanowires, comprising:

providing or preparing a capping agent compound which is a polymer obtainable by polymerizing polymerizable monomers comprising a monomer of formula (1)

(1)

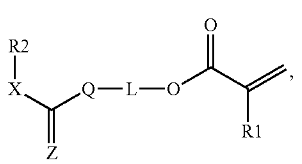

wherein

R1 is H or $CH_3$,

L is a linking group having a total number of 1 to 25 carbon atoms and a total number of 0 to 10 oxygen atoms, Q is O or S or N—R3, Z is O or S or NH, X is O or S or $CH_2$ or NH, and R2 and R3 are independently of each other hydrogen, a substituted alkyl having a total number of 1 to 25 carbon atoms and a total number of 0 to 5 heteroatoms, or unsubstituted alkyl having a total number of 1 to 25 carbon, or R2 and R3 together represent an alkanediyl having n carbon atoms wherein n is an integer from 2 to 9, wherein said alkanediyl together with the atom X and the nitrogen atom of N—R3 forms a heterocyclic ring having n+3 ring atoms, preparing a mixture comprising said capping agent compound, a polyol component, and a silver compound, and optionally an oxygen scavenger compound selected from the group consisting of a copper compound, an iron compound and a combination thereof, reacting said silver compound in said mixture with said polyol component, so that said silver nanowires are produced.

14. The method according to claim 13, further comprising:

heating the mixture from a temperature in a range of from 10 to 30° C. to a reaction temperature in a range of from 120 to 160° C. within a period of time not exceeding 2 minutes.

15. The method of claim 13, wherein the polyol component comprises at least one compound selected from the group consisting of ethylene glycol, glucose, 1,2-propanediol, 1,3-propanediol, and glycerin.

16. The method of claim 13, wherein the reacting of the silver compound with the polyol component is at least continued until one or more of the resulting silver nanowires have a length along their major axis of 0.5 μm or more, and/or has a duration in a range of from 10 min to 120 min, and/or has a duration of less than 120 min.

17. The method of claim 13, wherein a molar ratio of the total amount of said monomer of formula (1) to the total amount of silver ions in the mixture is in a range of from 0.1:1 to 40:1.

18. A product, comprising:

a silver nanowire obtained by the method of claim 13, wherein the silver nanowire has the capping agent compound adsorbed to a surface thereof.

* * * * *

UNITED STATES PATENT AND TRADEMARK OFFICE
CERTIFICATE OF CORRECTION

PATENT NO. : 10,661,348 B2
APPLICATION NO. : 15/554771
DATED : May 26, 2020
INVENTOR(S) : Li Chen et al.

It is certified that error appears in the above-identified patent and that said Letters Patent is hereby corrected as shown below:

In the Specification

Column 6, Line 66, "—Z is O," should read -- Z is O, --.

Column 8, Line 30, "0 in this" should read -- O in this --;
Line 43, "0 in this" should read -- O in this --.

Column 10, Line 49, "vinylpyrrolidon" should read -- vinylpyrrolidone --;
Line 57, "pyrrolidon" should read -- pyrrolidone --.

Column 11, Line 65, "weight (MW)" should read -- weight ($M_W$) --.

Column 12, Line 7, "CH3" should read -- $CH_3$ --;
Line 12, "-CH2-CH2-(O—CH2-CH2)n-" should read -- –CH2-CH2-(O-CH2-CH2)n- --;
Line 17 (approx.), "CH2 or NH" should read -- $CH_2$ or NH --;
Line 31, "weight (MW)" should read -- weight ($M_W$) --.

Signed and Sealed this
Twenty-fifth Day of August, 2020

Andrei Iancu
*Director of the United States Patent and Trademark Office*